US006460763B1

(12) United States Patent
Yoshinaga et al.

(10) Patent No.: US 6,460,763 B1
(45) **Date of Patent: *Oct. 8, 2002**

(54) SYSTEM AND METHOD OF OPERATION OF HOST AND TERMINAL UNIT HAVING FUNCTION FOR CONVERTING TRANSACTION AND COMMODITY INFORMATION INTO BAR CODE FOR PRINTING ON JOURNALS AND RECEIPTS AND READING THEREFORM FOR INPUT TO SYSTEM

(75) Inventors: Shinichi Yoshinaga, Kawasaki (JP); Miyuki Sato, Kawasaki (JP); Shigeki Enoki, Kawasaki (JP); Kiyoshi Utsumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 41 days.

This patent is subject to a terminal disclaimer.

(21) Appl. No.: 09/733,034

(22) Filed: Dec. 11, 2000

Related U.S. Application Data

(63) Continuation of application No. 08/337,222, filed on Nov. 7, 1994, now Pat. No. 6,189,781.

(30) Foreign Application Priority Data

Dec. 8, 1993 (JP) ............................................ 5-307632

(51) Int. Cl.[7] ................................................ G06F 17/00
(52) U.S. Cl. ....................................... 235/375; 235/379
(58) Field of Search ................................ 235/375, 379, 235/383; 705/14, 16, 18

(56) References Cited

U.S. PATENT DOCUMENTS

| | | | | |
|---|---|---|---|---|
| 4,529,871 | A | 7/1985 | Davidson | |
| 5,162,639 | A | 11/1992 | Sugiyama | |
| 5,250,789 | A | 10/1993 | Johnsen | |
| 5,278,396 | A | 1/1994 | McGaha | |
| 5,399,846 | A | 3/1995 | Pavlidis et al. | |
| 6,189,781 | B1 * | 2/2001 | Yoshinaga et al. .......... | 235/375 |

FOREIGN PATENT DOCUMENTS

| | | |
|---|---|---|
| JP | 59-194261 | 11/1984 |

* cited by examiner

*Primary Examiner*—Karl D. Frech
(74) *Attorney, Agent, or Firm*—Staas & Halsey LLP

(57) ABSTRACT

A terminal unit, to which commodity information is input, processes the input commodity information. The terminal unit includes a first conversion unit for converting transaction information including at least the input commodity information into information corresponding to a high density bar code, the transaction information being information regarding the transaction of one or a plurality of commodities, and a bar code printing unit for printing the high density bar code on a sheet based on the information obtained by the first conversion unit. The terminal unit may further includes a reading unit for optically reading the high density bar code, printed on the recording sheet, representing the transaction information and for outputting the transaction information represented by the bar code, the transaction information being processed by the terminal unit.

39 Claims, 11 Drawing Sheets

FIG. 7A

| POS NO. | DEPARTMENT | NUMBER | AMOUNT |
|---|---|---|---|
| 1001 | 001 | 10 | 1800 |
| | 002 | 80 | 19000 |
| | | | |
| | | | |
| 1002 | | | |

FIG. 7B

| DEPARTMENT | POS NO. | NUMBER | AMOUNT |
|---|---|---|---|
| 001 | 1001 | | |
| | 1002 | | |
| | TOTAL | | |
| 002 | | | |
| | | | |

FIG. 9

ACCOUNTS SERVICE YY, MM,DD

| DATE | SYNOPSIS | AMOUNT |
|---|---|---|
| MM DD | VEGETABLE | 286 |
| MM DD | EGG | 208 |
| ⋮ | ⋮ | ⋮ |
| | TOTAL | 14,980 |

SYSTEM AND METHOD OF OPERATION OF HOST AND TERMINAL UNIT HAVING FUNCTION FOR CONVERTING TRANSACTION AND COMMODITY INFORMATION INTO BAR CODE FOR PRINTING ON JOURNALS AND RECEIPTS AND READING THEREFORM FOR INPUT TO SYSTEM

This application is a continuation of application Ser. No. 08/337,222, filed Nov. 7 , 1994, now U.S. Pat. No. 6,189, 781.

BACKGROUND OF THE INVENTION

1. Field of the Inventions

The present invention generally relates to a terminal unit, such as a POS (Point-of-Sale) terminal unit, and more particularly to a terminal unit in which commodity information input therein can be converted into a bar code and vice versa.

2. Description of the Related Art

Conventionally, in stores, in order to register information (including names, identification codes, unit prices, quantity and the like) on commodities bought by customers, POS (Point-of-Sales) terminal units have been used. The POS terminal units print the information on receipt papers and journal papers and transmit the information to a host computer. The information processed day the POS terminal units is referred to as transaction information. The transaction information includes commodity information and other information regarding the transaction. The commodity information may include a commodity name, an identification code of a commodity, a unit price of a commodity, a number of commodities of each kind and consumption tax. Other information may include a total price, a date, a name of an operator of a POS terminal unit, a commodity dealing department and an identification number of a POS terminal unit.

If incorrect commodity information (e.g. the unit price of a commodity or the quantity of a commodity) is registered by a POS terminal unit by mistake so that a receipt paper on which the incorrect commodity information has been printed is given to a customer, the registered incorrect commodity information must be corrected. In this case, in order to correct the incorrect commodity information which has been registered, an operator manually inputs, with reference to the transaction information on the receipt paper, the incorrect commodity information into the POS terminal unit by using a keyboard.

In a host computer coupled to a plurality of POS terminal units, transaction data items including information about commodities transmitted from the POS terminal units are aggregated. In this system formed of the POS terminal units and the host computer, if a trouble occurs in the host computer, the above transaction data items can not be aggregated in the host computer. In this case, transaction data items printed on journal papers in the respective POS terminal units are used as backup data. That is, the transaction data items are manually input, with reference to the journal papers, into the POS terminal units.

In the conventional POS terminal unit, as has been described above, to correct registered information and to aggregate transaction data items in place of the host computer, transaction data items must be manually input with reference to receipt papers or journal papers. Thus, input errors may easily occur.

In addition, for example, the following service for customers has been proposed.

In the host computer, transaction information supplied from the POS terminal units is aggregated for each customer having a membership card. When an aggregate request is input to a POS terminal unit along with a membership number identifying a customer, transaction information which has been aggregated for the customer is transmitted from the host computer to the POS terminal unit. The aggregated transaction information for the customer is printed by the POS terminal unit and the printout is given to the customer. The customer can use the printout as accounts for himself (herself). This service is referred to as an accounts supply service.

However, to provide this accounts supply service, the aggregated transaction information for each customer must be usually stored in a storage unit of the host computer. In addition, a customer not having a membership card can not obtain the accounts supply service.

SUMMARY OF THE INVENTION

Accordingly, a general object of the present invention is to provide a novel and useful terminal unit, such as a POS terminal unit, in which the disadvantages of the aforementioned prior art are eliminated.

A more specific object of the present invention is to provide a terminal unit capable of printing out commodity information, which has been registered, having a form which can be easily input to the terminal unit.

The above objects of the present invention are achieved by a terminal unit, to which commodity information is input, for processing input commodity information, the commodity information being information regarding one or a plurality of commodities in a transaction, the terminal unit comprising: first conversion means for converting transaction information including at least the input commodity information into information corresponding to a bar code, the transaction information being information regarding the transaction of one or a plurality of commodities; and bar code printing means for printing the bar code on a sheet based on the information obtained by the first conversion means.

According to the present invention, sine the commodity information is printed on a recording paper as a bar code, the commodity information can be easily input to the terminal unit by scanning the bar code.

Another object of the present invention is to provide a terminal unit capable of easily processing target commodity information items which have been input therein.

The above object of the present invention is achieved by a terminal unit further including reading means for optically reading the bar code, printed on the recording sheet, representing the transaction information and for outputting the transaction information represented by the bar code, the transaction information being processed by the terminal unit.

According to the present invention, target commodity information items which have been input to the terminal unit can be easily obtained by optically reading the bar code, printed on the recording sheet, representing the transaction information including the target commodity information items. As a result, the target commodity information items which have been input to the terminal unit can be easily processed.

For example, the target commodity information can be easily corrected by using the transaction information obtained by the reading means.

Further, the target commodity information can be easily aggregated by using the transaction information obtained by the reading means.

In addition, the aggregate result may be printed out on a recording sheet. The aggregate result may be also transmitted to a host unit coupled to the terminal unit.

BRIEF DESCRIPTION OF THE DRAWINGS

Other objects, features and advantages of the present invention will become apparent from the following detailed description when read in conjunction with the accompanying drawings, in which:

FIG. 7A is a diagram illustrating a structure of data aggregated for each terminal;

FIG. 7B is a diagram illustrating a structure of data aggregated for each dealing department;

FIG. 9 is a diagram illustrating an example of a form supplied in the accounts supply service.

DESCRIPTION OF THE PREFERRED EMBODIMENTS

A description will given of an embodiment of the present invention.

Figure 1:
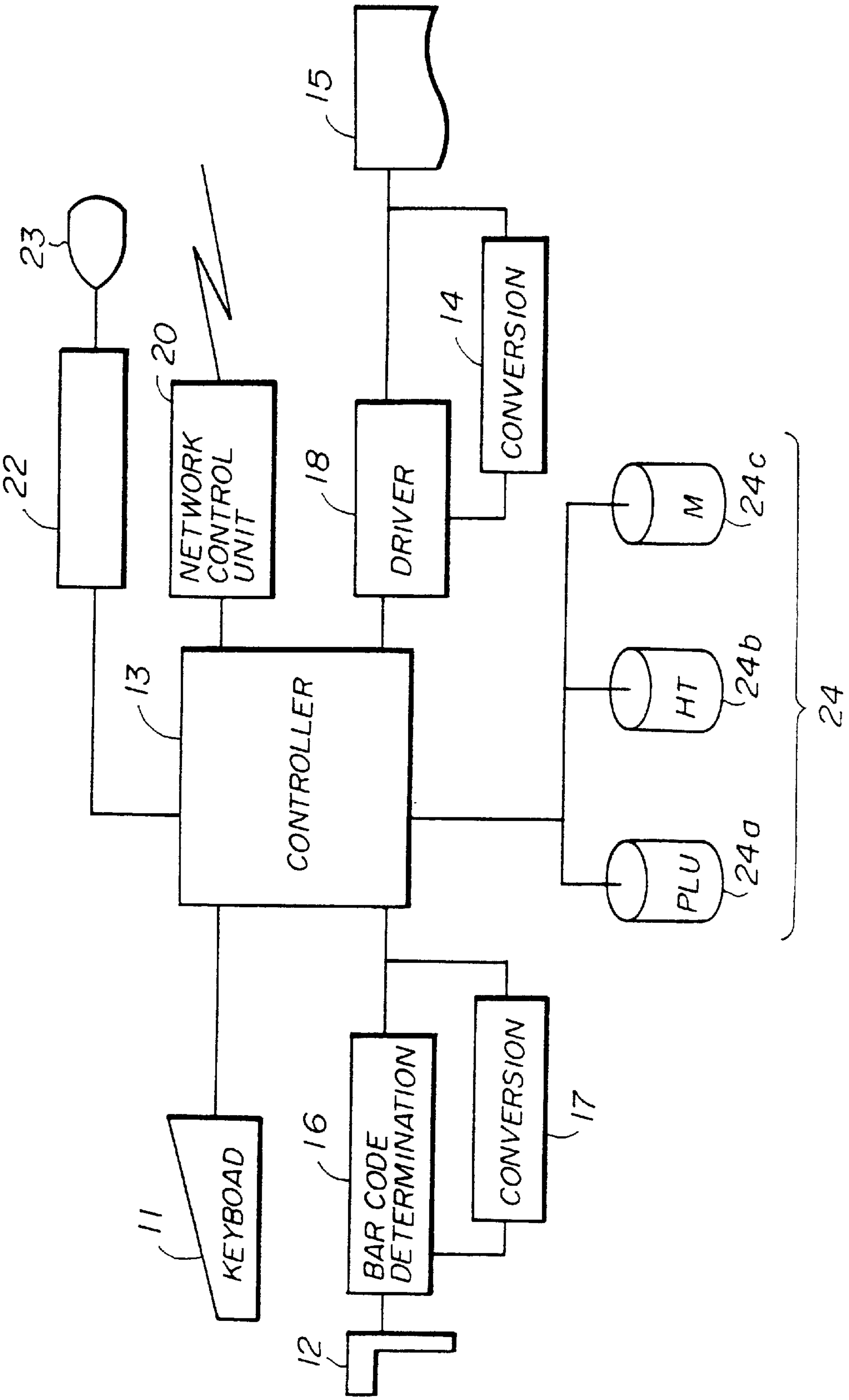
FIG. 1 is a block diagram illustrating a system of a host computer connected over a network to a POS terminal unit according to an embodiment of the present invention.

FIG. 1 shows a POS terminal unit 10 according to an embodiment of the present invention. Referring to FIG. 1, a POS terminal unit has a keyboard 11, a scanner 12, a controller 13, a first conversion unit 14, a printer unit 15, a bar code determination unit 16, a second conversion unit 17, a driver circuit 18, a network control unit 20, a display driving circuit 22, a display unit 23 and a storage unit 24. Information about commodities bought by customers are input by means of the keyboard 11 and the scanner 12.

The scanner 12 optically scans a bar code, such as a JAN code, provided on each commodity and outputs commodity information including a commodity name, a commodity code and the like. The bar code determination unit 16 determines, based on information supplied from the scanner 12, whether the scanner 12 has scanned a normal bar code which is provided on each commodity or a high-density bar code which will be described later. When the bar code determination unit 16 determines that the scanner 12 has scanned the normal bar code, the commodity information is supplied to the controller 13 via the bar code determination unit 16. The storage unit 24 has a first unit 24_a_ storing a price lookup table (PLU), a second unit 24_b_ storing a hard-total (HT) aggregate and a memory 24_c_. The controller 13 adds a unit price to the commodity information with reference to the price look-up table stored in the first unit 24_a_ of the storage unit. The commodity information including the commodity name, the commodity code, the unit price and the number of commodities of each kind is stored in the memory 24_c_. The controller also performs an aggregate process for aggregating commodity information of respective commodities. The result thereof is stored, as the aggregate result (hard-total), in the second unit 24_b_ of the storage unit 24. The commodity information items corresponding to the respective commodities are supplied to the driver circuit 18. The driver circuit 18 drives printers of the printer unit (PRNTR) 15 based on the commodity information items, so that commodity information items (e.g. commodity names, commodity codes, unit prices, the number of commodities and consumption tax) are printed on receipt and journal media (e.g., a receipt paper and a journal paper). The aggregate results stored in the second unit 24_b_ of the storage unit 24 are supplied to the network control unit 20 via the controller 13 and transmitted from the network control unit 20 to the host computer 40 via the network 30. The host computer 40 carries out management of transactions based on the aggregate results supplied from the respective POS terminals 10 (of which only one is shown in FIG. 1).

When an input operation performed by using the scanner 12 and the keyboard 11 is completed, the commodity information in a transaction is read out from the memory 24_c_. The commodity information read out from the memory 24_c_ and other information such as a total price of commodities in a transaction, an identification number of the POS terminal, a commodity dealing department, a date and an operator name are supplied to the first conversion unit 14 via the driver circuit 18. The first conversion unit 14 converts the above information into pattern data corresponding to a high density bar code.

Figure 3A:
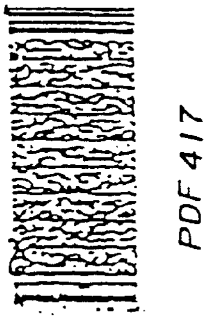
FIGS. 3A, 3B, 3C and 3D are diagrams illustrating examples of high density codes.
Figure 3B:
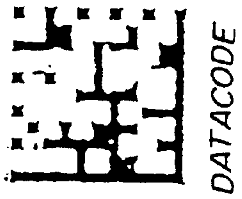
Figure 3C:
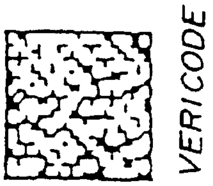
Figure 3D:
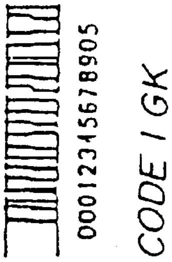

The high density bar code is also referred to as a multi-dimensional bar code (e.g. a two-dimensional bar code). The high density bar code differs from the normal bar code such as the JAN code in that English characters and Japanese characters (Kana characters and Chinese characters) can be coiled into the high density bar code. That is, an amount of information represented by the high density bar code is significantly greater than an amount of information represented by the normal bar code. Examples of the high density bar code are shown in FIGS. 3A, 3B, 3C and 3D. A code pattern shown in FIG. 3A is referred to as a PSD 417, a code pattern shown in FIG. 3B is referred to as a DATACODE, a code pattern shown in FIG. 3C is referred to as a VERICODE and a code pattern shown in FIG. 3D is referred to as a code 16_k_. The high density bar code can represent the above transaction information, such as commodity names, commodity codes, unit prices, the number of commodities, the total price of commodities in a transaction, the identification number of the POS terminal, the commodity dealing department, the date and the operator name.

Figure 2A:
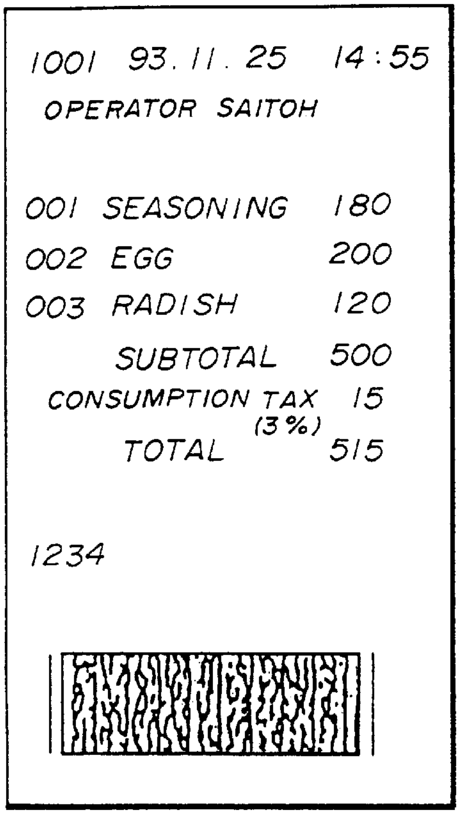
FIG. 2A is a diagram illustrating an example of a receipt paper on which transaction data items have been printed.
Figure 2B:
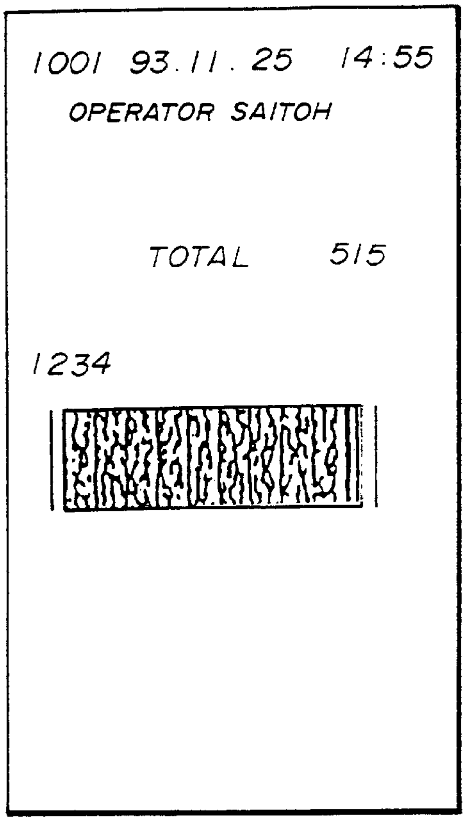
FIG. 2B is a diagram illustrating an example of a journal paper on which transaction data items have been printed.
Figure 4:
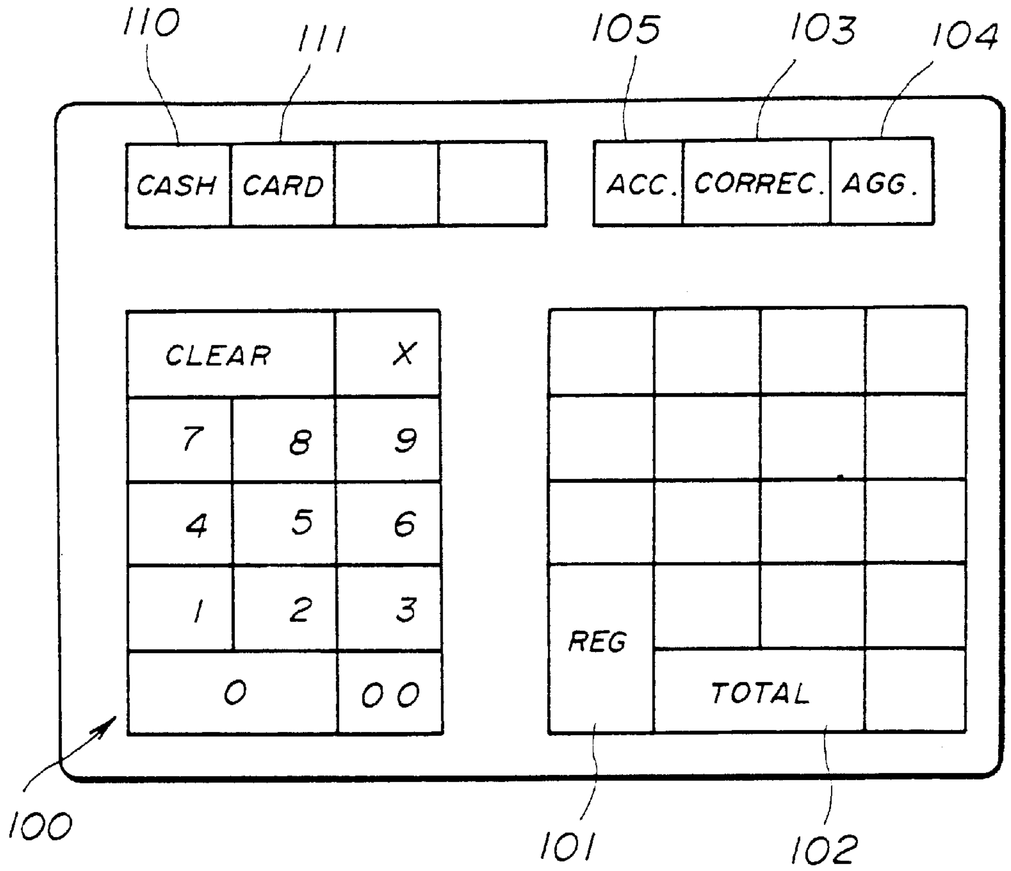
FIG. 4 is a diagram illustrating an example of a layout in a keyboard.

The transaction information printed on the receipt paper and the journal paper for a transaction is converted into pattern data corresponding to a high density bar code by the first conversion unit 14 and printed on the receipt paper and the journal paper as respectively shown in FIGS. 2A and 2B. The journal paper is printed for a store. Thus, in a case where the above transaction information is printed as the high density bar code, only the total price and the operator name may be printed as characters on the journal. On the other hand, the receipt paper is printed for a customer. Thus, commodity names, prices, consumption tax and the like must be printed as characters on the receipt papers The keyboard 11 is formed as shown in FIG. 4. Referring to FIG. 4, the keyboard 11 has ten keys 100, a register key 101, a total key 102, a correction key 103, a substitute aggregate key 104, an accounts supply key 105, a cash key 110 and a credit card key 111. The register key 101 is operated for the normal register operation. The correction key 103 is operated to correct commodity information which has been input. The substitute aggregate key 104 is operated to aggregates commodity information items in place of the host computer 40. The account supply key 105 is operated for the account supply service.

The scanner 12 can optically read the high density bar code printed on the receipt paper and the journal paper. When the bar code determination unit 16 determines that the bar code read by the scanner 12 is the high density bar codes, information output from the scanner 12 is supplied to the second conversion unit 17 via the bar code determination unit 16. The second conversion unit 17 converts the information supplied from the scanner 12 into character information corresponding to the transaction information represented by the high density bar code read key the scanner. The character information is supplied to the controller 13. The controller 13 processes the transaction information (corresponding to the character information) and supplies a part (the commodity information) of the transaction information to the display driving circuit 22. The display driving circuit 22 drives the display unit 23 based on the commodity information, so that the display unit 23 displays the commodity information.

Figure 10A:
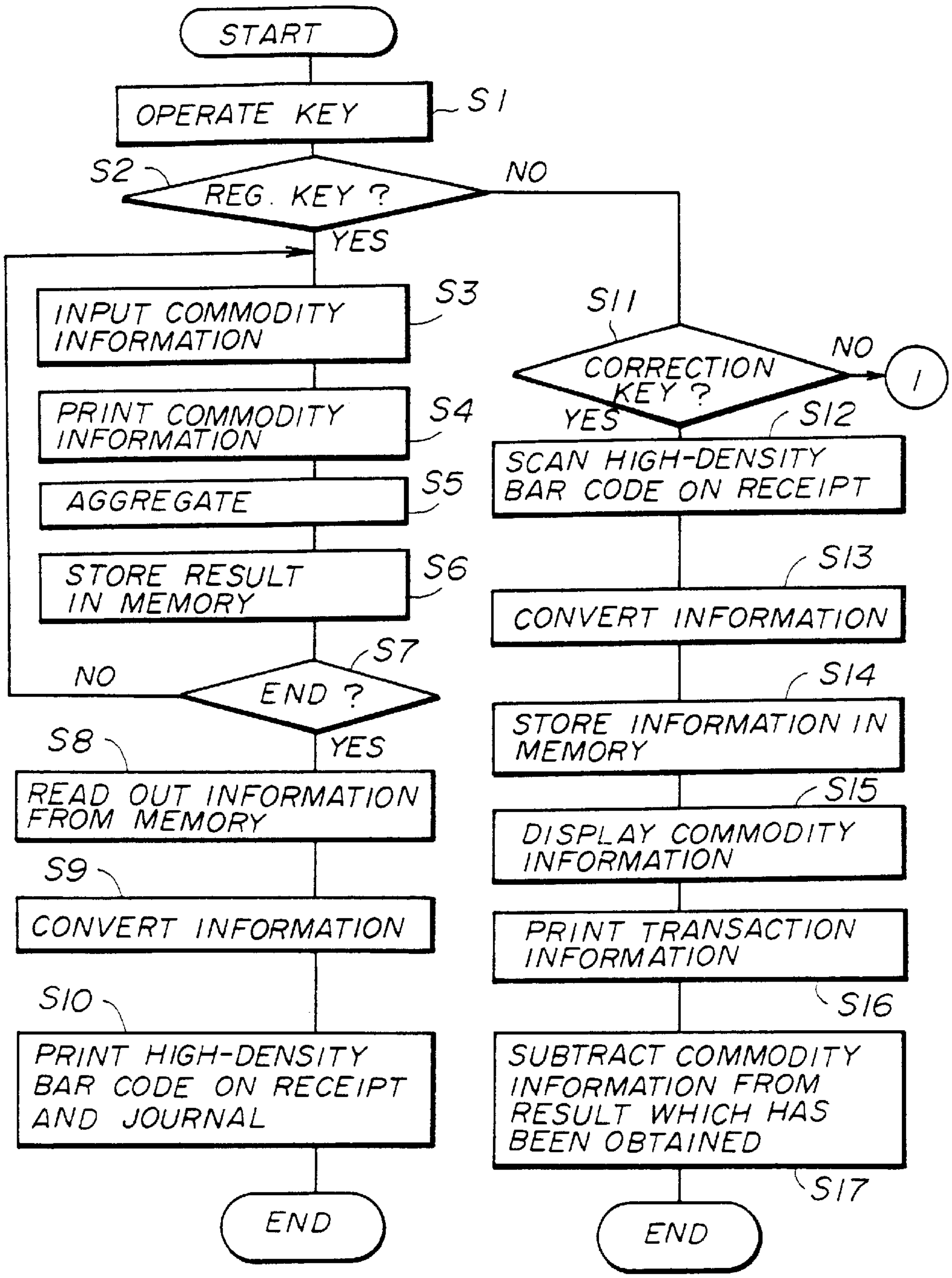
FIGS. 10A and 10B are flow charts illustrating a process carried out by a POS terminal unit.
Figure 10B:
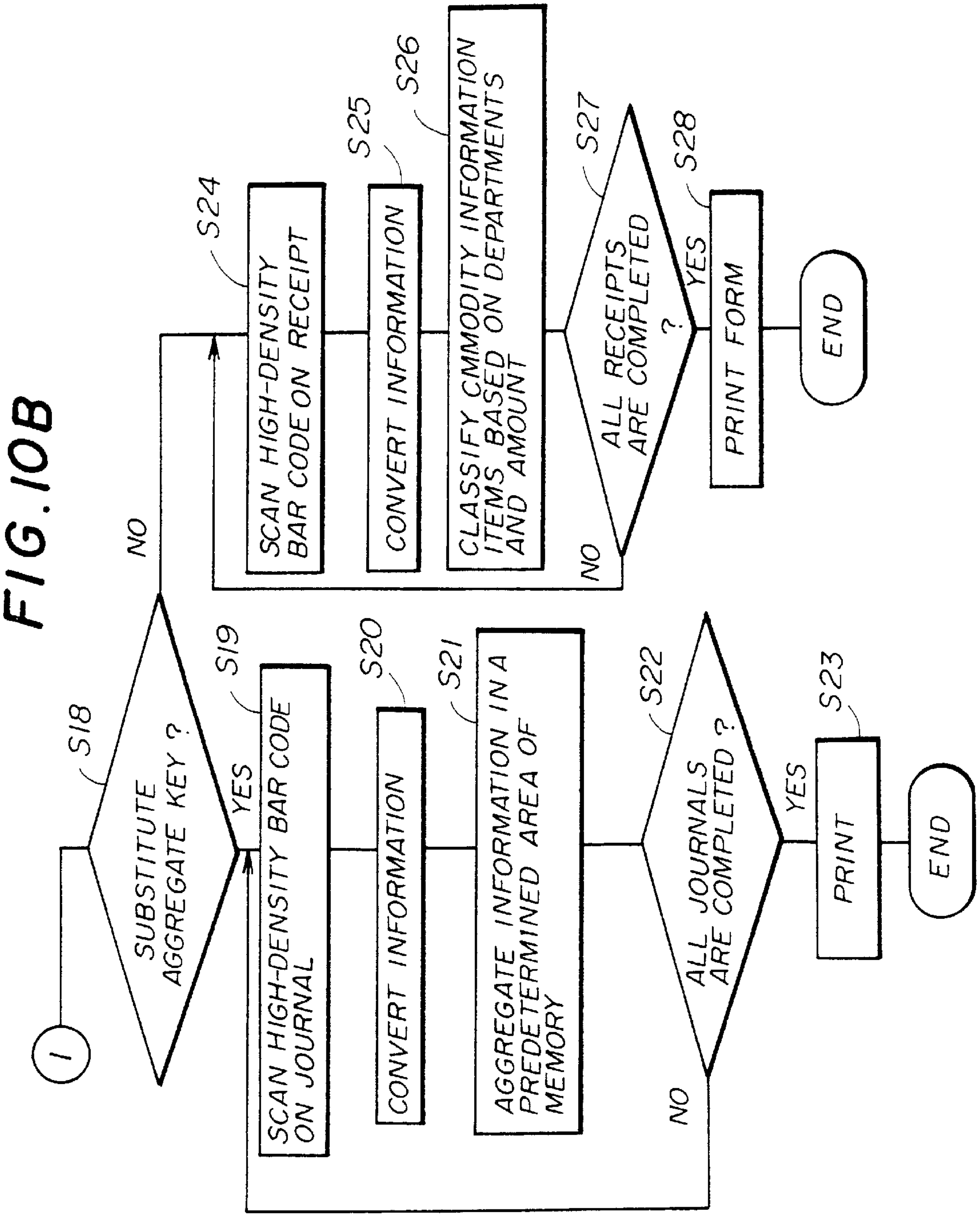

A process is executed in the POS terminal in accordance with the flowcharts shown in FIGS. 10A and 10B.

Referring to FIG. 10A, after a key of the keyboard 11 is operated (S1), it is determined whether the operated key is the register key 101. In the case of a register operation, a bar code, representing commodity information, provided on each commodity is scanned day the scanner 12 after the register key 101 is operated. In this case, it is determined, in step S2, that the operated key is the register key 101. The information from the scanner 12 and the keyboard 11 is then supplied to the controller 13 (S3). A commodity information item is printed on the receipt paper and the journal paper every time the commodity information is input to this POS terminal unit (S4). Commodity information items (prices) are aggregated (S5), and the itemized commodity information and the aggregate results are stored in the storage unit 24 (S6). After this, it is determined whether-or not the register operation is completed, that is, whether or not the total key 102 is operated (S7). If the total key 102 has not yet been operated, commodity information items for the next commodity are processed in accordance with the same steps S3, S4, S5 and S6. These steps are repeated until the total key 102 is operated.

If the total key 102 is operated (S7), the total price of the commodities, the consumption tax and other transaction information are printed on the receipt paper. After this, the commodity information items for the present transaction are read out from the memory 24*c* (S8). The commodity information items from the memory 24*c* and other transaction information supplied from the controller 13 are converted into pattern data corresponding to the high density bar code by the first conversion unit 14 (S9). The pattern data from the first conversion unit 14 is supplied to the printer unit 15, so that the printer unit 15 prints the high density bar code representing the commodity information items on the receipt paper and the journal paper as respectively shown in FIG. 2A and 2B (S10). The receipt paper (FIG. 2A) on which characters corresponding to the transaction information including the commodity information items have been printed is given by the operator to the customer.

Figure 5:
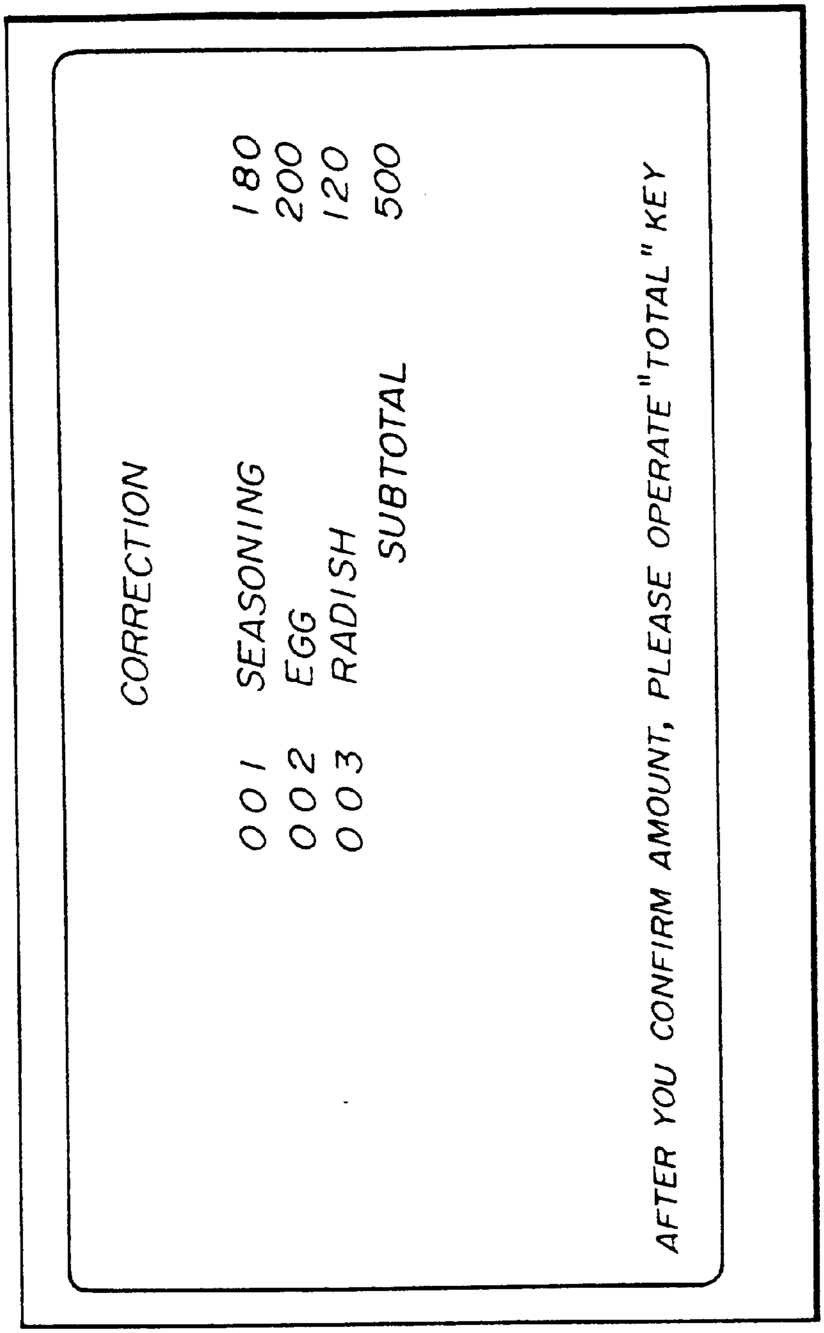
FIG. 5 is a diagram illustrating an example of a screen of a display unit.
Figure 6:
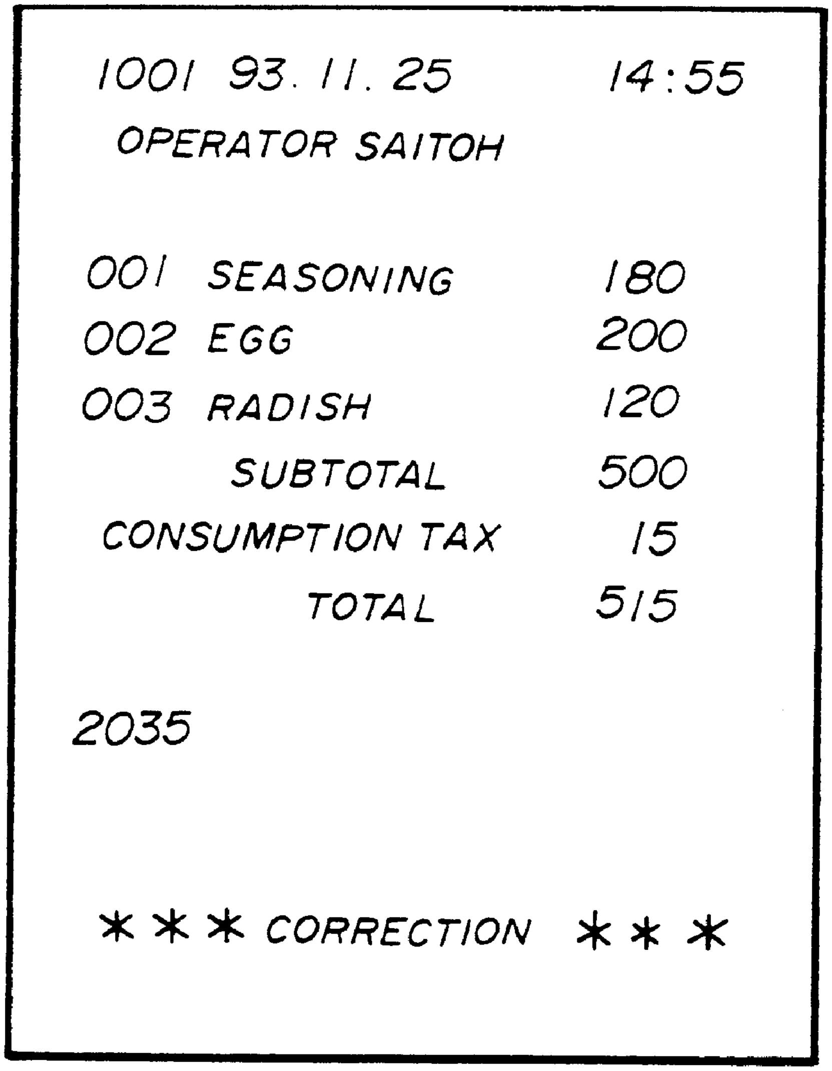
FIG. 6 is a diagram illustrating an example of a correct receipt obtained in a correction mode.

In a case where the operator is aware that an error has occurred in the register operation, the operator operates the correction key 103 of the keyboard 11. In this case, after it is determined, in step S2, that the operated key is not the register key 101, it is determined, in step S11, that the correction key 103 has been operated. After this, the high density bar code printed on the receipt paper is scanned by the scanner 12 (S12). The high density bar code represents the commodity information including information to be corrected. Since the bar code determination unit 16 determines, in this case, that the scanner 12 has scanned the high density bar code, the information output from the scanner 12 is supplied to the second conversion unit 17 via the bar code determination unit 16. The second conversion unit 17 converts the information supplied from the scanner 12 into character information corresponding to the transaction information represented by the high density bar code (S13). The transaction information is then stored in the memory 24*c* (S14). The transaction information includes incorrect information which has been registered in the last register operation. The commodity information included in the transaction information is read out from the memory 24*c* and is then displayed by the display unit 23 as shown in FIG. 5 (S15). The operator looks at the screen of the display unit 23 and can confirm that the commodity information includes the incorrect information. In this state, when the operator operates the total key 102, the. transaction information stored in the memory 24*c* is supplied to the printer unit 15 via the controller 13 and the driver circuit 18. As a result, the transaction information to be corrected is printed on a receipt paper as shown in FIG. 6 (S16). In addition, the commodity information items, such as prices of commodities and the number of commodities of each kind, are subtracted from the aggregate result stored in the second unit 24*b* (the HT aggregate) of the storage unit 24 (S17). After this, the commodity information items including correct information items, to which the incorrect information items are changed, are input by using the keyboard 11, and added to the aggregated result from which the incorrect data has been subtracted.

Only incorrect information selected from the commodity information items displayed by the display unit 23 may be subtracted from the aggregate results.

If a trouble, such as a network malfunction, occurs in the system so that the host computer 40 can not execute the aggregation of the commodity information items, the journal papers are collected, from the respective POS terminal units coupled to the host computer, at one or some selected POS terminals. In each POS terminal to which the journal papers are collected, the following operations, referred to as a substitute aggregation, are carried out.

Figure 8:
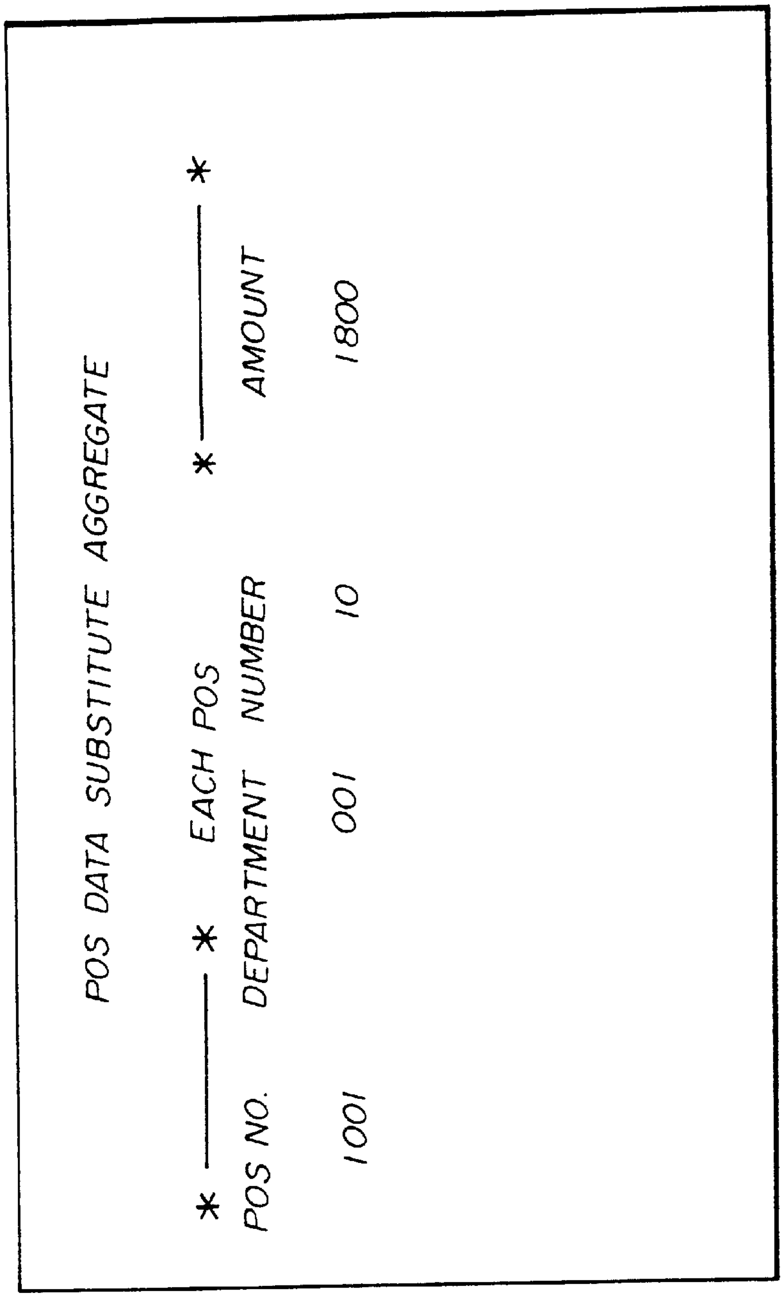
FIG. 8 is a diagram illustrating an example of a form on which aggregated data items are arranged.

First, the operator operates the substitute aggregate key 104. In this case, it is determined, in step S11, that the correction key 103 is not operated, and the process proceeds to step S18 shown in rig. 10B. Referring to FIG. 10B, it is determined, in step S18, that the substitute aggregate key 104 has been operated. After the substitute aggregate key 104 is operated, the high density bar codes printed on the collected journal papers are scanned by the scanner 12 one by one (S19). Information output from the scanner 12 is supplied to the second conversion unit 17 via the liar code determination unit 16. The second conversion unit 17 converts the information supplied from the scanner 12 into character information corresponding to the transaction information represented by the high density bar codes (S20). The controller 13 aggregates commodity information items (e.g. prices and the number of commodities) included in the transaction information supplied from the second conversion unit 17 in a predetermined area of the memory 24*c* (S21). In this substitute aggregate process, the commodity information items are classified into groups for respective POS terminals 10 and the classified commodity information items in each group are aggregated for each commodity dealing department, as shown in FIG. 7A. The commodity information items may be classified into groups for respective commodity dealing departments and the classified commodity information items in each group may be aggregated for each POS terminal, as shown in FIG. 7B. The substitute aggregate process in steps S19, S20 and S21 is repeated until the high density bar codes on all journals have been completely processed (S22). After this, an aggregate result, for a POS terminal, is read out from the predetermined area of the memory 24*c* and printed in a form as shown in FIG. 8 by the printer unit 15 (S23).

If the host computer is recovered, the aggregate results stored in the memory 24*c* may be transmitted from the network control unit 20 to the host computer 40.

The accounts supply service for a customer may be performed as follows.

Figure 9:
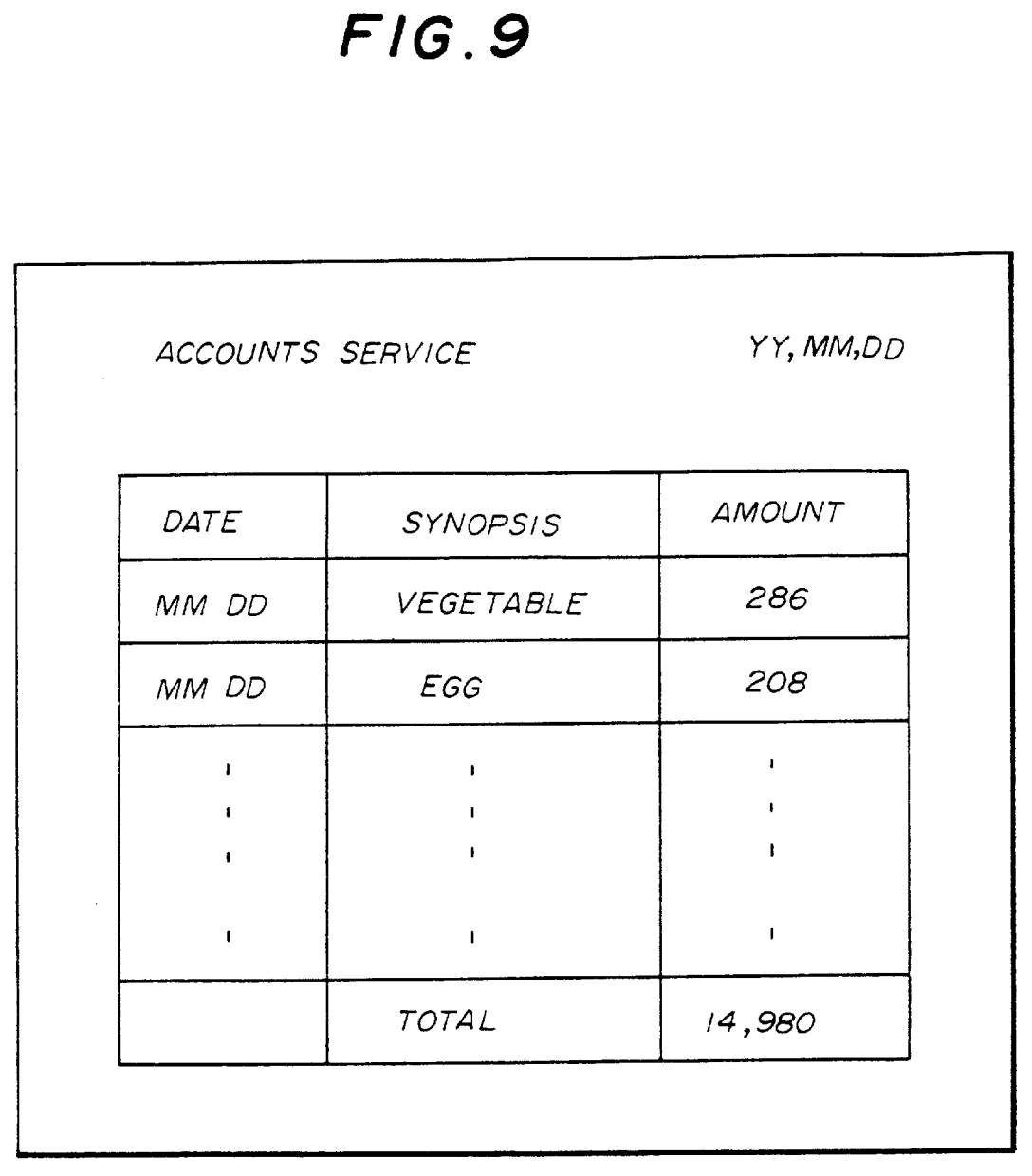

In a case where a customer brings receipt papers which have been collected in a predetermined period (e.g. a month) to a store, an operator of a POS terminal unit operates the accounts supply key 105. In this case, it is determined, in step S18 shown in FIG. 10B, that the substitute aggregate key 104 has not been operated. The high density bar codes printed on the receipt papers brought by the customer are scanned by the scanner 12 (S24). Information output from the scanner 12 is converted, by the second conversion unit 17, into character information corresponding to the transaction information (commodity names, commodity codes, unit prices, numbers of commodities, dates and the like) represented by the high density bar codes (S25). The controller 13 aggregates commodity information items (e.g. prices. and the number of commodities) included in the transaction information supplied from the second conversion unit 17 in a predetermined area of the memory 24*c* (S26). After this, the aggregate result is read out from the predetermined area of the memory 24*c* and printed in a form as shown in FIG. 9 (S28). The customer receives the printed form, which can be used as a household accounts in the predetermined period (e.g. a month).

According to the POS system as has been described above, the high density bar code representing the transaction information including commodity information items is printed on a receipt paper and a journal paper. Thus, the trading information can be input to the POS terminal 10 by optically reading the high density bar code without performing the manual input operation using the keyboard. In addition the commodity information obtained by optically reading the high density bar code can be used to correct commodity information which has been registered and for various services. The aggregation of commodity information items can be performed by using high density bar codes printed on the journal papers in the respective POS terminal units 10.

The present invention is not limited to the aforementioned embodiments, and variations and modifications may be made without departing from the scope of the claimed invention.

What is claimed is:

1. A system processing information relating to commodities involved in transactions, the information comprising commodity information identifying commodities involved in a related transaction and transaction information identifying the related transaction in which the commodities are involved, comprising:

plural terminal units, each having an identification code and processing one or more commodities involved in a transaction, in each of plural successive transactions, each transaction being individually identified by a transaction code, each terminal unit further comprising:

an input unit inputting to the terminal unit commodity information identifying commodities involved in a related transaction and transaction information identifying the related transaction, a memory storing unit prices corresponding to the commodities, a converter converting commodity information and related transaction information into, and outputting, corresponding bar code print information, and a printer, selectively printing on each of a receipt sheet and a journal sheet, human readable characters and machine readable bar code patterns in accordance with character print information and bar code print information supplied thereto, a controller in response to each initiation of a transaction related to the purchase of one or more commodities obtaining, as specific transaction information, the identification and stored, unit price of each purchased commodity from the input unit and the memory, respectively, and determining, at the conclusion of the related transaction, the aggregate results thereof including the aggregate of all units of all purchased commodities and the respective, total purchase price thereof, the controller, further, supplying to the printer corresponding character print information and bar code print information and controlling the printer to print, on a receipt sheet, the character print information and the bar code print information corresponding to the specific transaction information, as human readable characters and a machine readable bar code pattern, respectively, and to print, on a journal sheet, a selected, reduced amount of the character print information relative to that printed on a receipt sheet and the bar code print information corresponding to the specific transaction information, as human readable characters, of a corresponding, reduced amount relative to those printed on the receipt sheet, and a machine readable bar code pattern, respectively;

a host computer connected over a network to each of the plural terminal units;

each terminal unit, upon completion of a transaction, transmitting the corresponding specific transaction information over the network to the host computer; and the host computer managing transactions of the plural terminal units, based on the respective, specific transaction information thereof transmitted thereto.

2. A system as recited in claim 1, wherein each commodity includes a bar code thereon identifying the commodity, the input unit further comprising:

a scanner, scanning the bar code of each commodity and outputting corresponding bar code information;

a bar code converter converting the bar code information to an identification of the corresponding commodity; and a keyboard having plural control keys affording selection of respective, different operating functions of the terminal unit and number and letter keys affording manual input of commodity identification, unit price and transaction information.

3. A system as recited in claim 2, wherein:

a register control key, when actuated, designates the initiation of a transaction.

4. A system as recited in claim 2, wherein:

a total control key, when actuated, designates the completion of a currently active transaction and instructs the controller to total the aggregate prices of the commodities of the related transaction.

5. A system as recited in claim 2, wherein:

an error correction control key, when actuated, instructs the controller to perform an error correction of a prior, completed transaction printed on a corresponding receipt or journal sheet therefor;

the controller, in response to the error correction instruction, controls the scanner to scan the machine readable bar code information from the sheet and controls the converter to convert the read bar code information to commodity and transaction information display data, and controls a display thereof on a display unit for viewing by an operator to enable correction of errors therein by manipulation of appropriate keys of the keyboard by the operator; and the controller, in response to actuation of the total control key subsequently to completion of the error correction, supplies the corrected information as corrected, specific transaction information to the printer for printing on corrected, receipt and journal sheets.

6. A system as recited in claim 2, wherein:

a data transfer control key, when actuated following a loss of communications over the network between a terminal unit and the host computer and upon resumption of communications thereover, instructs the controller to initiate data transmission from the terminal unit to the host computer;

the controller, in response to actuation of the data transfer key, controls the scanner to scan printed bar code patterns from each journal sheet supplied thereto, relating to a transaction at the terminal unit during the interval of the loss of communications over the network, and controls the converter to convert the scanned bar code pattern to, and output, the corresponding commodity and related transaction information as the specific transaction information including the aggregate results of the related transaction; and the controller transmits the specific transmission information over the network to the host computer.

7. A system as recited in claim 2, wherein:

a customer service control key, when actuated, instructs causes the controller to perform a customer service of aggregating information of commodity transactions of a customer;

the controller, in response to actuation of the customer service control key, controls the scanner to scan bar code print information on plural receipt sheets of the customer for respective transactions of the customer and for which an aggregate of the respective, specific transaction information thereon over a specified time period is to be determined, and controls the converter to convert the scanned bar code information into the corresponding commodity and related transaction information; and the controller aggregates the commodity and related transaction information and produces an aggregate result thereof as character print information and controls the printer to print same on an aggregate commodity and transaction sheet for the specified time period.

8. A system as recited in claim 2, wherein:

the host computer, further, classifies the commodity information, including at least the number of a common type of commodities included in each of plural, specific transaction information transmissions thereto from each of one or more terminal units in relation to corresponding commodity dealing departments for the commodities subject to transactions thereby to provide an aggregate of the number of units of each commodity, over the time period to which the transaction information transmissions, from the one or more terminal units, relate, correlated to the respective commodity dealing department.

9. A system as recited in claim 8, wherein:

in each terminal unit, a substitute aggregate key, when actuated, instructs the controller to perform a substitute aggregate function in accordance with reading specific transaction data from respective journal sheets; and the controller, in response to actuation of the substitute aggregate control key, controls the scanner to scan bar code information on plural journal sheets and controls a converter to convert the scan bar code information into the corresponding commodity and related transaction information and, further, classifies the commodity and related transaction information into groups corresponding to respective dealing departments and aggregates the respective units of the classified commodities in the corresponding groups for the respective commodity dealing departments.

10. A system as recited in claim 1, wherein:

the machine readable bar code pattern identifying each commodity is of a first bar code type; and the machine readable bar code pattern, corresponding to specific transaction information, comprises a bar code pattern of a second type, of a higher density than the first type.

11. A system as recited in claim 10, wherein the higher density bar code pattern is a two-dimensional high density bar code pattern.

12. A system as recited in claim 1, wherein transaction information further comprises an identification code of the terminal unit at which a transaction occurs, a department code for a respective department dealing with each commodity which is subject to a transaction, a transaction date and an identification code of an operator of the terminal unit.

13. A system having a host and at least one terminal unit coupled thereto over a network, the host computer receiving aggregate results from each terminal with respect to each transaction processed at each terminal including the related commodities involved in each transaction and carrying out management of transactions based on the aggregate results, each commodity having a machine readable bar code pattern thereon identifying the commodity, each terminal unit having a terminal identification code identifying the terminal and determining transaction information each transaction comprising transaction code identifying the transaction, a number of each commodity and, in accordance with a respective unit price thereof, an aggregate price of a total of the units of each commodity and a grand total aggregate of the prices of all commodities and any related expenses involved in the transaction, wherein:

each terminal unit processes one or more commodities involved in a transaction, for each of plural transactions, and comprises:

a printer, selectively printing on a receipt sheet and on a journal sheet, human readable characters and machine readable bar code patterns, in accordance with character print information and bar code print information supplied thereto, a scanner selectively, optically scanning bar code patterns on commodities identifying same and on printed receipts and journals identifying commodities related to a transaction and related transaction information, and outputting corresponding bar code information;

a memory storing unit prices corresponding to the commodities;

a controller, for each transaction and in response to bar code information output by said scanner identifying a commodity related to the transaction, outputting the corresponding commodity identifying information as commodity character print information and selecting and upon completion of the transaction, outputting a first set of related transaction information, as corresponding transaction character print information and controlling the printer to print the corresponding commodity and selected, first set of related transaction information as human readable print characters on a receipt;

a converter converting the commodity identifying information and a second set of transaction information into corresponding commodity and transaction bar code print information, the controller, in response to a completed transaction, aggregating the related transaction and commodity identifying information and selectively supplying to the printer:

bar code print information for all commodities involved in a transaction and the first set of selected transaction information and controlling the printer to print same on a receipt sheet and, selected transaction information as transaction human readable character print information and the second set of transaction information, including both commodity identification information and aggregate commodity information for the completed transaction, on a journal sheet.

14. The terminal unit as claimed in claim 13, wherein said commodity information selected by the controller for printing as corresponding human readable characters on the receipt sheet comprises at least a commodity name and a unit price of the commodity.

15. The terminal unit as claimed in claim 14, wherein the transaction information selected by the controller for printing in human readable characters on the receipt sheet for each transaction comprises at least one of the date and the time of the transaction and the total price of all commodities involved in the related transaction.

16. A method of processing information relating to commodities involved in transactions, the information comprising commodity information identifying commodities involved in a related transaction and transaction information identifying the related transaction in which the commodities are involved, comprising:

inputting commodity information identifying commodities involved in a related transaction and transaction information identifying the related transaction, for each of plural successive transactions, storing unit prices corresponding to the commodities, in response to an initiation of a transaction related to a purchase of one or more commodities, obtaining, as specific transaction information, the identification of each purchased commodity, as input, and the stored unit price thereof and, at the completion of the transaction, the aggregate results of the related transaction including the aggregate of all units of all purchased commodities and the respective, total purchase price thereof and generating corresponding character print information and bar code print information;

selectively printing, on a receipt sheet, both the character print information and the bar code print information corresponding to the specific transaction information, as human readable characters and a machine readable bar code pattern, respectively, and, on a journal sheet, a selected, reduced amount of the character print information, relative to that printed on a receipt sheet, and the bar code print information corresponding to the specific transaction information as a corresponding, reduced amount of human readable characters, relative to those printed on a receipt sheet, and a machine readable bar code pattern, respectively;

at each terminal unit and for each completed transaction, and for all terminal units and respective completed transactions, transmitting the corresponding specific transaction information to a host computer over a network; and managing transactions of the plural terminal units at the host computer, based on the respective, specific transaction information thereof transmitted thereto.

17. A method as recited in claim 16, wherein each commodity includes a bar code thereon identifying the commodity, further comprising:

scanning the bar code of each commodity and outputting corresponding bar code information;

converting the bar code information to an identification of the corresponding commodity; and selectively generating control inputs affording, when actuated, selection of respective, different operating functions of the terminal unit and number and letter inputs affording manual input of commodity identification, unit price and transaction information.

18. A method as recited in claim 17, wherein:

a selective register input, when actuated, designates the initiation of a transaction.

19. A method as recited in claim 17, wherein:

a selective total input, when actuated, designates the completion of a currently active transaction and produces a total of the aggregate prices of the commodities of the related transaction.

20. A method as recited in claim 17, wherein:

an error correction input, when actuated, instructs an error correction of a prior, completed transaction printed on a corresponding receipt or journal sheet therefor;

in response to the error correction instruction, scanning the machine readable bar code information from the corresponding sheet and converting the read bar code information to commodity and transaction information display data, and producing a display thereof on a display unit for viewing by an operator, to enable correction of errors therein by appropriate manual inputs by the operator; and in response to actuation of the total input subsequently to completion of the error correction, supplying the corrected information as corrected, specific transaction information for printing on corrected, receipt and journal sheets.

21. A method as recited in claim 17, wherein:

a data transfer input, when actuated following a loss of communications over the network between a terminal unit and the host computer and upon resumption of communications thereover, initiates data transmission from the terminal unit to the host computer;

in response to actuation of a data transfer input, scanning printed bar code patterns from a journal sheet relating to a transaction at the terminal unit during the interval of the loss of communications over the network, and converting the scanned bar code pattern to the corresponding commodity and related transaction information as the specific transaction information including the aggregate results of the related transaction; and transmitting the specific transmission information over the network to the host computer.

22. A method as recited in claim 16, wherein a customer service input, when actuated, instructs performance of a customer service of aggregating information of commodity transactions of a customer, further comprising:

in response to actuation of the customer service input, scanning bar code print information on plural receipt sheets of the customer for respective transactions of the customer and for which an aggregate of the respective, specific transaction information thereon over a specified time period is to be determined, and converting the scanned bar code information into the corresponding commodity and related transaction information; and aggregating the commodity and related transaction information and producing an aggregate result thereof as character print information and printing same on an aggregate commodity and transaction sheet for the specified time period.

23. A method as recited in claim 16, further comprising:

at the host computer, classifying the commodity information, including at least the number of each common type of commodities included in each of plural, specific transaction information transmissions thereto from each of one or more terminal units in relation to corresponding commodity dealing departments for the commodities subject to transactions, thereby to provide an aggregate of the number of units of each commodity, over a time period to which the respective transaction information transmissions from the one or more terminal units relate, correlated to the respective commodity dealing department.

24. A method as recited in claim 16, wherein a substitute aggregate input, at each terminal unit and when actuated, instructs the performance of a substitute aggregate function, further comprising:

in response to actuation of the substitute aggregate input, scanning bar code information from each of plural journal sheets and converting the scanned bar code information into corresponding specification transaction data, including the commodity and related transaction information; and classifying the commodity and related transaction information into groups corresponding to respective dealing departments and aggregating the respective units of the classified commodities in the corresponding groups for the respective commodity dealing departments.

25. A method as recited in claim 16, wherein:

the machine readable bar code pattern identifying each commodity is of a first bar code type; and the machine readable bar code pattern, corresponding to specific transaction information, comprises a bar code pattern of a second type, of a higher density than the first type.

26. A method as recited in claim 25, wherein the higher density bar code pattern is a two-dimensional high density bar code pattern.

27. A method as recited in claim 18, wherein transaction information further comprises an identification code of the terminal unit at which a transaction occurs, a department code for a respective department dealing with each commodity which is subject to a transaction, a transaction date and an identification code of an operator of the terminal unit.

28. A memory medium as recited in claim 16, the memory medium further controlling the computer to process information by:

at the host computer, classifying the commodity information, including at least the number of each common type of commodities included in each of plural, specific transaction information transmissions thereto from each of one or more terminal units in relation to corresponding commodity dealing departments for the commodities subject to transactions, thereby to provide an aggregate of the number of units of each commodity, over a time period to which the respective transaction information transmissions from the one or more terminal units relate, correlated to the respective commodity dealing department.

29. A memory medium storing a program for controlling a computer to process information relating to commodities involved in transactions, the information comprising commodity information identifying commodities involved in a related transaction and transaction information identifying the related transaction in which the commodities are involved, by:

inputting commodity information identifying commodities involved in a related transaction and transaction information identifying the related transaction, for each of plural successive transactions, storing unit prices corresponding to the commodities, in response to an initiation of a transaction related to a purchase of one or more commodities, obtaining, as specific transaction information, the identification of each purchased commodity, as input, and the stored unit price thereof and, at the completion of the transaction, the aggregate results of the related transaction including the aggregate of all units of all purchased commodities and the respective, total purchase price thereof and generating corresponding character print information and bar code print information;

selectively printing, on a receipt sheet, both the character print information and the bar code print information corresponding to the specific transaction information, as human readable characters and a machine readable bar code pattern, respectively, and, on a journal sheet, a selected, reduced amount of the character print information, relative to that printed on a receipt sheet, and the bar code print information corresponding to the specific transaction information as a corresponding, reduced amount of human readable characters, relative to those printed on a receipt sheet, and a machine readable bar code pattern, respectively;

at each terminal unit and for each completed transaction, and for all terminal units and respective completed transactions, transmitting the corresponding specific transaction information to a host computer over a network; and managing transactions of the plural terminal units at the host computer, based on the respective, specific transaction information thereof transmitted thereto.

30. A memory medium as recited in claim 29, wherein each commodity includes a bar code thereon identifying the commodity, the memory medium further controlling the computer to process information by:

scanning the bar code of each commodity and outputting corresponding bar code information;

converting the bar code information to an identification of the corresponding commodity; and selectively generating control inputs affording, when actuated, selection of respective, different operating functions of the terminal unit and number and letter inputs affording manual input of commodity identification, unit price and transaction information.

31. A memory medium as recited in claim 30, the memory medium further controlling the computer to process information by:

designating the initiation of a transaction by a selective register input, when actuated.

32. A memory medium as recited in claim 30, the memory medium further controlling the computer to process information by:

designating the completion of a currently active transaction and producing a total of the aggregate prices of the commodities of the related transaction by a selective total input, when actuated.

33. A memory medium as recited in claim 30, the memory medium further controlling the computer to process information by:

instructing an error correction of a prior, completed transaction printed on a corresponding receipt or journal sheet therefor by an error correction input, when actuated;

in response to the error correction instruction, scanning the machine readable bar code information from the corresponding sheet and converting the read bar code information to commodity and transaction information display data, and producing a display thereof on a display unit for viewing by an operator, to enable correction of errors therein by appropriate manual inputs by the operator; and in response to actuation of the total input subsequently to completion of the error correction, supplying the corrected information as corrected, specific transaction information for printing on corrected, receipt and journal sheets.

34. A memory medium as recited in claim 29, the memory medium further controlling the computer to process information by:

initiating data transmission from the terminal unit to the host computer by a data transfer input, when actuated following a loss of communications over the network between a terminal unit and the host computer and upon resumption of communications thereover;

in response to actuation of a data transfer input, scanning printed bar code patterns from a journal sheet relating to a transaction at the terminal unit during the interval of the loss of communications over the network, and converting the scanned bar code pattern to the corresponding commodity and related transaction information as the specific transaction information including the aggregate results of the related transaction; and transmitting the specific transmission information over the network to the host computer.

35. A memory medium as recited in claim 29, wherein a customer service input, when actuated, instructs performance of a customer service of aggregating information of commodity transactions of a customer, the memory medium further controlling the computer to produce information by:

in response to actuation of the customer service input, scanning bar code print information on plural receipt sheets of the customer for respective transactions of the customer and for which an aggregate of the respective, specific transaction information thereon over a specified time period is to be determined, and converting the scanned bar code information into the corresponding commodity and related transaction information; and aggregating the commodity and related transaction information and producing an aggregate result thereof as character print information and printing same on an aggregate commodity and transaction sheet for the specified time period.

36. A memory medium as recited in claim 29, wherein a substitute aggregate input, at each terminal unit and when actuated, instructs the performance of a substitute aggregate function, the memory medium further controlling the computer to process information by:

in response to actuation of the substitute aggregate input, scanning bar code information from each of plural journal sheets and converting the scanned bar code information into corresponding specification transaction data, including the commodity and related transaction information; and classifying the commodity and related transaction information into groups corresponding to respective dealing departments and aggregating the respective units of the classified commodities in the corresponding groups for the respective commodity dealing departments.

37. A method as recited in claim 29, wherein:

the machine readable bar code pattern identifying each commodity is of a first bar code type; and the machine readable bar code pattern, corresponding to specific transaction information, comprises a bar code pattern of a second type, of a higher density than the first type.

38. A method as recited in claim 37, wherein the higher density bar code pattern is a two-dimensional high density bar code pattern.

39. A method as recited in claim 29, wherein transaction information further comprises an identification code of the terminal unit at which a transaction occurs, a department code for a respective department dealing with each commodity which is subject to a transaction, a transaction date and an identification code of an operator of the terminal unit.

* * * * *

UNITED STATES PATENT AND TRADEMARK OFFICE

CERTIFICATE OF CORRECTION

PATENT NO. : 6,460,763 B1

DATED : October 8, 2002

INVENTOR(S) : Shinichi Yoshinaga et al.

It is certified that error appears in the above-identified patent and that said Letters Patent is hereby corrected as shown below:

Title page, Item [54] and Column 1, line 7,
Title, change "THEREFORM" to -- THEREFROM --.

Column 14,
Line 8, change "18" to -- 16 --.

Signed and Sealed this

Twentieth Day of April, 2004

JON W. DUDAS
*Acting Director of the United States Patent and Trademark Office*